United States Patent [19]

Mahner et al.

[11] 3,835,392

[45] Sept. 10, 1974

[54] SYSTEM FOR TWO OR MORE COMBINED COMMUNICATION CHANNELS REGULATED IN ACCORDANCE WITH LINEAR RELATIONSHIPS

[75] Inventors: Helmut Mahner, Munich; Karl Kammerlander, Wolfratshausen, both of Germany

[73] Assignee: Siemens Aktiengesellschaft, Berlin & Munich, Germany

[22] Filed: Mar. 28, 1973

[21] Appl. No.: 345,774

Related U.S. Application Data

[63] Continuation of Ser. No. 94,850, Dec. 3, 1970, abandoned.

[52] U.S. Cl. ................ 325/306, 325/305, 325/369, 325/372, 325/404, 325/405, 325/409, 325/431, 325/435, 325/476

[51] Int. Cl. .......................................... H04b 1/06

[58] Field of Search ..................... 325/60, 301–306, 325/346, 351, 366–372, 378, 387, 388, 398, 404, 405, 409, 431, 435, 444, 474, 476; 179/15 R; 329/50, 178, 179; 328/155, 163, 166; 343/100 PE, 100 CS, 100 CL, 100 LE

[56] References Cited

UNITED STATES PATENTS

| | | | |
|---|---|---|---|
| 3,174,104 | 3/1965 | Easter et al. | 325/369 |
| 3,339,199 | 8/1967 | Pichafroy | 325/305 |
| 3,553,590 | 1/1971 | Hofgren | 328/155 |

*Primary Examiner*—Albert J. Mayer

*Attorney, Agent, or Firm*—Herbert L. Lerner

[57] ABSTRACT

Two or more communication channels containing coherent signals of respectively different amplitudes and phases aside from respective uncorrelated spurious signals of mutually equal intensities, are combined to a channel of optimal signal-to-noise ratio. This is done by transforming the original signals in a combiner network to an equal number of linear combinations, and regulating the respective transformations by controlling real parameters thereof so as to eliminate correlation between the linear combinations. As a result, the combined signal of the output channel exhibits the desired optimum of signal-to-noise ratio.

3 Claims, 5 Drawing Figures

SYSTEM FOR TWO OR MORE COMBINED COMMUNICATION CHANNELS REGULATED IN ACCORDANCE WITH LINEAR RELATIONSHIPS

This is a continuation, of U.S. Pat. application Ser. No. 94,850, filed Dec. 3, 1970 now abandoned.

Our invention concerns itself with combining two or more interrelated communication channels, that contain coherent signals of respectively different amplitudes and phases aside from respective uncorrelated spurious signals of mutually equal intensities, to a combination-signal channel of optimal signal-to-noise ratio.

In communication techniques there if often encountered the problem to combine two communication channels that contain the same useful signals of respectively different amplitudes and phases as well as uncorrelated spurious signals of the same respective intensities, to a combined or sum channel whose signal-to-noise ratio is an optimum. This problem, for example, occurs with the so-called polarization diversity receiver equipments which are supposed to receive with continuously best feasible antenna gain a sequence of radio signals, transmitted for from a satellite, whose type of polarization continuously changes on accout of the satellite travel.

This problem will be briefly elucidated with reference to FIG. 1 of the accompanying drawings.

Schematically shown in FIG. 1 are two antennas 10 and 10'. The radiation characteristics of the two antennas are oriented in the same receiving direction; but the antenna 10, for example, is horizontally polarized and the antenna 10' is vertically polarized. The signals coming from antennas 10 and 10' pass to respective receivers 11 and 11'. Each receiver is equipped with automatic gain control 12 and 12', schematically represented by a feedback loop. Such automatic gain control is commonly denoted in the electronic art simply by the corresponding initials AGC. The communication channels A and B coming from respective receivers 11 and 11' lead to a circuit arrangement or network 15 to whose output a demodulator 16 is connected, this demodulator being understood to be any device or circuitry suitable for the desired useful utilization or the arriving signals.

Since the network 15 precedes the demodulator 16 and hence the detector proper of the system, the network 15 for combining the channels A and B is customarily called "Predetection Combiner." More rarely the combination of the channels takes place behind the demodulator, in which case the combiner network is called "Postdetection Combiner." The circuit principles in both cases are substantially the same.

As shown in FIG. 1 by broken lines 13 and 13', a controlling information is supplied to the combiner network 15 from the respective feedback loops 12, 12' of the automatic gain control. The resulting control of the combiner network 15 causes this network to form a meaningful combination of channels A and B in such a manner that at any time the one channel with the better signal-to-noise ratio is applied to the demodulator 16 with correspondingly greater weight (intensity).

With a suitable electrical dimensioning of the combiner, the optimal combination of channels A and B can be formed, theoretically for any amplitude and phase conditions of the antenna voltage, i.e., for any elliptical polarization. However, since the information is taken off prior to joining the two channels, the combiner in this known arrangement performs only a control rather than a regulation. This considerably affects the performance accuracy of the overall system. Inaccuracies, particularly result from the necessity of measuring the intensity of the useful signals or the noise level interval in the two receiving channels. In the described example such measuring results occur indirectly from the AGC performance. In other known system of this general type the measuring takes place indirectly as a consequence of the control operation acting upon the predetection combiner.

It is an object of our invention to minimize or avoid the above-mentioned inaccuracies of performance and to devise circuitry that combines two or more interrelated communication channels to a channel of improved signal-to-noise ratio and which operates in a regulatory manner to maintain such at an optimal value.

Another object of our invention is to assure the optimalizing regulation performance even in the event of greatly fluctuating disturbance signals, such as galactic noise, as may occur in dependence upon changes in antenna position.

Still another object of the invention is to increase the regulating precision of systems generally of the type described above, so as to make such a system also suitable for measuring the type of polarization.

A further object of our invention is to provide a combiner system suitable for use with a receiver whose automatic gain control (AGC) and automatic phase regulation (APC) act conjointly on all of the receiving channels.

Another object of the invention is to afford the desired optimal combination of two or more receiving channels regardless of the amplitude and phase conditions of the useful signals in the various channels, without the necessity of measuring these amplitudes and phases.

To achieve these objects and in accordance with one aspect of our invention, we combine two communication channels, that contain coherent signals of respectively different amplitudes and phases as well as uncorrelated spurious signals of mutually equal intensity, to a combined channel of optimal signal-to-noise ratio; and for producing the signal combination we provide a combiner network which, generally by unitary transformation, forms two linear combinations of the original signals. We further provide the transformation system with two regulating circuits which control two real parameters of the transformation so as to obviate the existence of correlation between the two linear combinations.

The above-mentioned objects, advantages and features or our invention, said features being set forth with particularity in the claims annexed hereto, will be apparent from, and will be mentioned in, the following description of system embodiments according to the invention illustrated by way of example on the accompanying drawings, in which:

FIG. 1 already described, shows a known network system;

Figure 1:
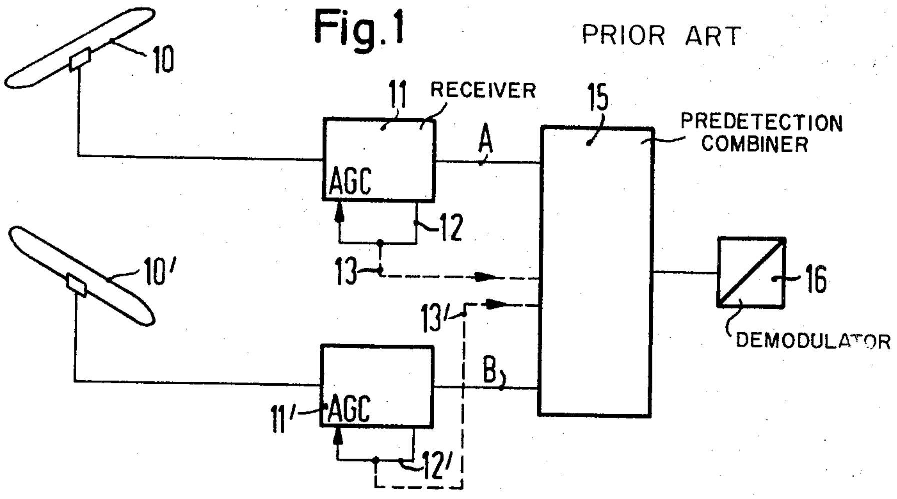
Figure 2:
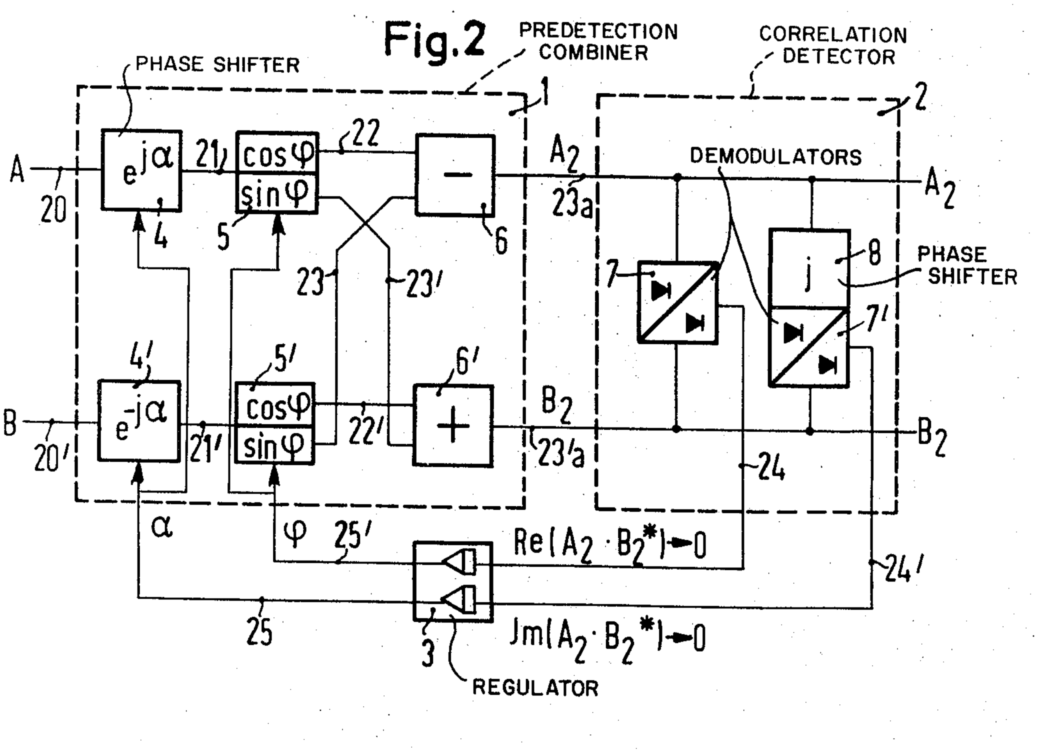
FIG. 2 is a block diagram of a first circuit network embodying the invention.
Figure 3:
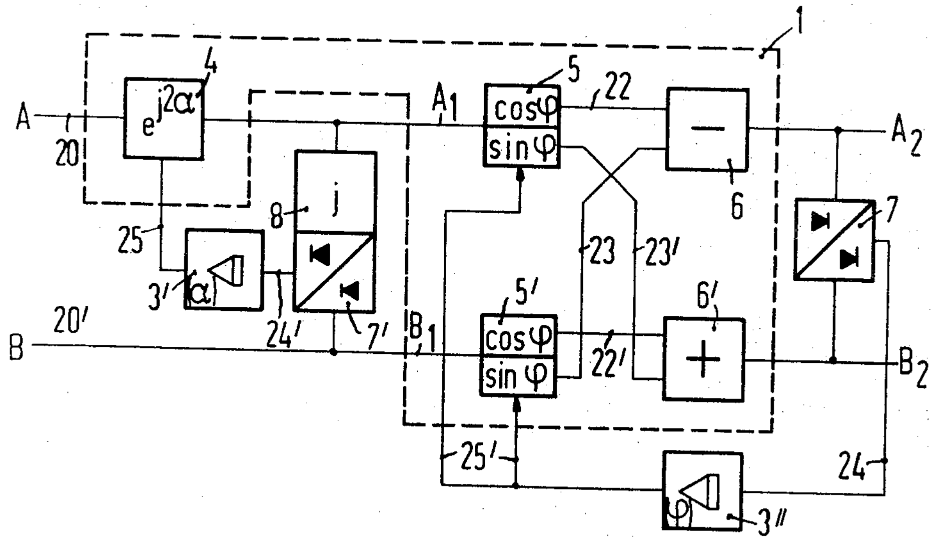
FIG. 3 shows schematically another embodiment of a network system according to the invention.
Figure 4:
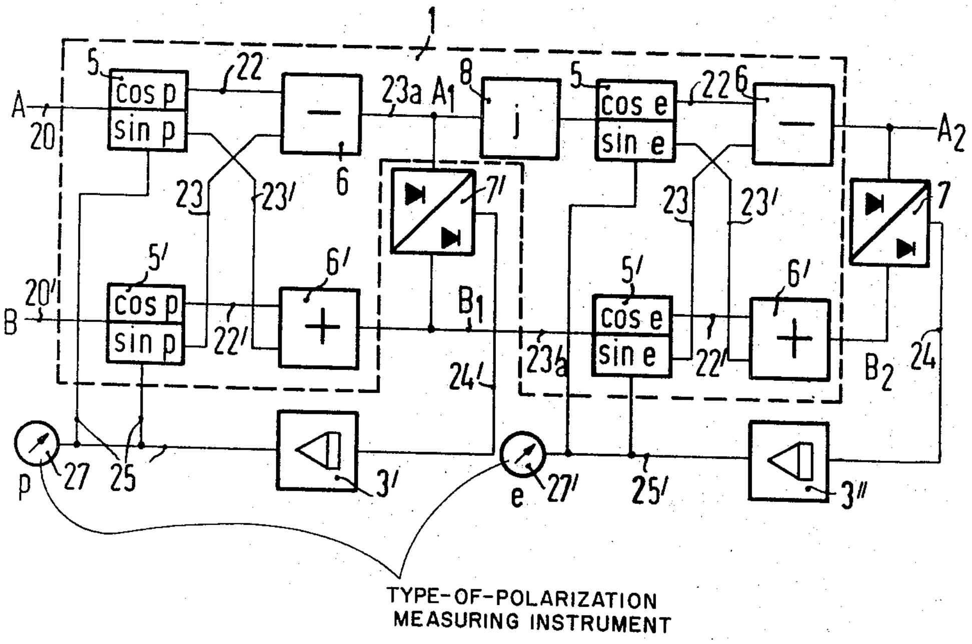
FIG. 4 is a circuit diagram of a modified system generally comparable to that of FIG. 3.
Figure 5:
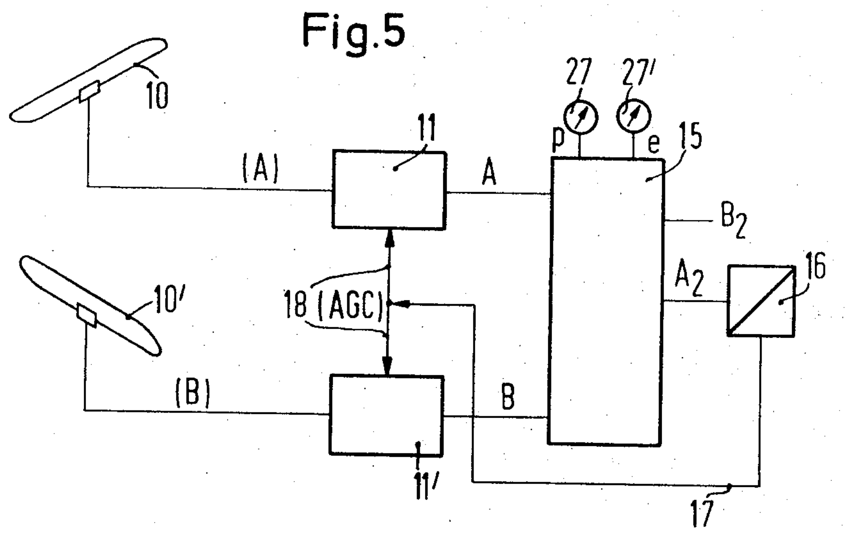
FIG. 5 is a diagram relating to systems according to FIGS. 2 to 4 in a receiving station operating on the polarization diversity principle.

The legends applied to FIGS. 1 and 2 to the various components of network modules also apply to the modules correspondingly identified by the same respective symbols in FIGS. 3 to 5. The same reference characters are used in all illustrations for denoting corresponding items respectively.

The invention is based upon the following consideration.

Using generally known rules of mathematics, two linear combinations $A_2$ and $B_2$ are derived from the given two original signals A and B in such a manner that these linear transformations are described by a unitary matrix which is a function of two real parameters, for example in the form:

$$A_2 = A \cdot \cos\phi \cdot e^{j\alpha} - B \cdot \sin\phi \cdot e^{-j\alpha}$$
$$B_2 = A \cdot \sin\phi \cdot e^{j\alpha} + B \cdot \cos\phi \cdot e^{-j\alpha} \qquad (1)$$

wherein $\phi$ and $\alpha$ are the two real parameters.

A general unitary transformation may at most differ from the thus identified form by phase displacements of the original signals, which are not significant in principle. In this case, constant quantities are added to the two parameters $\phi$ and $\alpha$ and the following general equations are obtained:

$$A_2 = A \cdot \cos\phi \cdot e^{j(\beta + \alpha)} - B \cdot \sin\phi \cdot e^{j(\beta - \alpha)}$$
$$B_2 = A \cdot \sin\phi \cdot e^{(\gamma + \alpha)} + B \cdot \cos\phi \cdot e^{(\gamma - \alpha)} \qquad (2)$$

wherein $\beta$ and $\gamma$ are the above-mentioned constant magnitudes.

Denoted by A, B, $A_2$, $B_2$ are mixtures of mutually correlated shares of useful signals and of shares of noise, i.e., spurious signals. The noise shares of A, B may be assumed to be uncorrelated and, as long as any present AGC acts equally upon both channels, to be of equal magnitudes respectively. Hence, independently of $\phi$ and $\alpha$, the noise shares of $A_2$ and $B_2$ are of equal magnitudes and uncorrelated. A certain value pair $\phi$, $\alpha$ is optimal and, in the event of constant noise, results in the best possible signal level in an output channel, for example $A_2$. The unitary transformation makes certain that then simultaneously the useful signal in the other output channel, for example the signal $B_2$, will vanish, thus eliminating the correlation between the two channels. A correlation product A $A_2 \cdot B^*_2 \neq 0$ therefore is indicative of non-optimal adjustment and can be utilized for varying the two parameters $\phi$ and $\alpha$ by means of a regulating circuit. In effect therefore, regulation of an error voltage is effected by suitable increase or decrease in the values of the parameters as a linear relationship. Since in the general case the term $A_2 \cdot B^*_2$ is complex two criteria for the control of the two parameters $\phi$ and $\alpha$ can be derived from the real and imaginary components.

Of course, the correlation product will also vanish if in the described example the entire useful signal appears in the other channel $B_2$ and disappears in channel $A_2$. By a suitable poling of the regulating circuits, a discrimination is then effected between the two limit possiblities of which only one is stable; and the stable case of control is then effected between the two limit possibilities of which only one is stable; and the stable case of control is then made effective whereas the labile state is immediately discarded.

The invention is also applicable to more than two receiving channels. Generally, for any plurality of n channels the unitary transformation is applied to form an equal number $n$ of output channels. The matrix then describing the transformation, possesses $n^2$ complex elements; but of those only $n(n-1)/2$ are linearly independent of a unitary matrix. For the purpose of the invention it is sufficient if only $(n-1)$ parameters are controllable by regulating circuits, the other $(n-1)(n-2)/2$ matrix elements being selectable at random. Available as criteria for controlling the $(n-1)$ complex parameters are the correlation products between the one output channel that contains the optimal combination on the one hand, and the $n-1$ other output channels on the other hand. Instead of the $(n-1)$ complex parameters, it is preferable in practice to regulate $2(n-1)$ real parameters.

The system illustrated in FIG. 2 directly embodies the above-described principle of combining two communication channels. While other means of performing the unitary transformation and other embodiments of the correlation detector are likewise applicable in accordance with the invention, the particular system exemplified in FIG. 2 is clearly based upon the type of mathematical presentation offered in the above-presented equation (1).

Since with respect to the antenna portion and demodulator portion, the system of FIG. 2 need not differ from that described above with reference to FIG. 1, the diagram of FIG. 2 shows only the predetection combiner proper identified by the components within the broken-line block 1, and the correlation detector which comprises the components within the broken-line block 2. The circuit portion 1 is capable of performing the unitary transformation. In analogy to FIG. 1, FIG. 2 shows two receiving channels A and B coming, for example, from a preamplifier. The signals are applied through lines 20 and 20′ to controllable phase shifters 4 and 4′ respectively. The phase shifter 4 for channel A effects a phase rotation about the angle $+\alpha$. The corresponding phase shifter 4′ for channel B effects a phase rotation about the angle $-\alpha$. Two multipliers 5, 5′ are connected through leads 21 and 21′ to the respective phase shifters 4, 4′ and multiply the arriving signal with the sine $\phi$ and cosine $\phi$ respectively of an and $\phi$. Connected behind the multipliers by means of leads 22, 23, and 22′ , 23′ are two adders 6 and 6′ which form the difference and the sum respectively of two quantities. Leads 22 and 22′ connect to the respective adders 6, 6′ the part of the respective multipliers 5 and 5′ that is multiplied with the factor cos $\phi$. Leads 23 and 23′ connect with the adders 6 and 6′ the respective multiplier portions that are multiplied with the factor sine $\phi$. Due to the sum and difference formation in the respective adders 6′ and 6, the quantities $A_2$ and $B_2$ corresponding to equation (1) are directly available at the outputs 23*a* and 23′*a* of the circuitry portion 1.

In the correlation detector 2, the quantities $A_2$ and $B_2$ are compared with each other for which purpose the leads 23*a* and 23′*a* are connected with each other through demodulators, or generally through non-linear means 7 and 7'. The demodulator 7' is preceded by a phase shifter 8 which effects a phase rotation by 90°, this being indicated in FIG. 2 by the letter *j*. The demodulators 7 and 7' are connected through leads 24 and 24' with a regulator 3 from which extend leads 25 and 25' to the respective phase shifters 4, 4' and to the multipliers 5 and 5'. The regulator controls the quantities $\alpha$ and $\phi$ in 4, 4' and 5, 5' respectively and thus takes care that the error signals coming from the demodulators 7 and 7' and corresponding to the real portion (R*e*) of the correlation product $A_2 \cdot B^*_2$ and to the imaginary portion (I*m*) of the correlation product $A_2 \cdot B^*_2$ will go toward zero. This is mathematically expressed by:

$$\mathrm{Re}(A_2 \cdot B^*_2) \rightarrow 0 \text{ and } \mathrm{Im}(A_2 \cdot B^*_2) \rightarrow 0$$

In accordance with the above-presented explanations, then there will appear only the signal $A_2$ or only the signal $B_2$. Care is taken that one signal thus utilized exhibits the best possible signal-to-noise ratio since the regulator 3 will vary the quantities $\alpha$ and $\phi$ until this condition is attained.

In the above-described embodiment of FIG. 2, a regulating loop is used for regulating two parameters, namely $\alpha$ and $\phi$. The individual components or modules of the system shown in FIG. 2 by block diagrams, may be designed and operative electronically in accordance with generally known and available modules so that a description of further details need not here be presented.

In accordance with a further development of the inventive concept embodied in the system described, the transformation according to Equation (1) or (2) may be subdivided into two sequential simpler transformations of which each is made dependent upon only one parameter, and the control criterion can then be gained at the output of the particular component transformation, so that two regulating circuits are obtained that are completely independent of each other.

A corresponding embodiment is shown in FIG. 3. In the system the signal A is subjected to time delay so that at first a pair of in-phase signals A1, B1 is derived from the respective channels A and B. Used as a criterion is the imaginary portion of the correlation product $A_1 \cdot B_1^*$. In the second regulating circuit there occurs a unitary transformation in the real share of the correlation product, i.e., the product not subjected to time delay. This leads to the resulting signals $A_2$ and $B_2$ in accordance with the criterion $\mathrm{Re}(_2 \cdot B^*_2) \rightarrow 0$. A unitary transformation of real quantities, as here involved, is also called "orthogonal transformation."

In FIG. 3 the broken line block 1 identifies the circuitry portion capable of forming the unitary transformation. Corresponding to FIG. 2, the channel A contains a phase shift member 4 which, in this case, effects a phase rotation $2\alpha$. The multipliers 5, 5' which form the sine and cosine of the angle $\phi$, and the next following adders 6 and 6' are also contained in the broken line block 1 analogous to the showing in FIG. 2.

In distinction from the system of FIG. 2, however, the system of FIG. 3 forms two regulating loops with respective single parameters. To this end, the channels A and B, directly behind the output of the phase shifter 4, are connected with each other through a demodulator 7' and a phase rotating member 8 effecting a rotation of 90°. The demodulator 7' is connected with the regulator 3' which regulates the quantity $\alpha$ and acts through a lead 25 upon the phase shifter 4. In the output portion of the circuitry, the leads carrying the signals $A_2$ and $B_2$ are connected through a demodulator 7 whose output is connected with a further regulator 3''. The regulator 3'' regulates the quantity $\phi$ and accordingly acts upon the multipliers 5 and 5' through respective leads 25'.

For applying the invention to a polarization diversity receiver, the circuitry according to FIG. 4 is particularly advantageous because its two regulating circuits are completely of the same type and their regulating perameters have a simple relation to the characteristic magnitudes of the incident polarization. The angle *p* directly indicates the position of the polarization main direction, and *e* is the arcus tangent of the axes ratio. The quantities *p* and *e*, with a suitable choice of the constant quantities $\beta$ and $\gamma$ according to equation (2) are derivable from the quantities $\alpha$ and $\phi$, as can be shown mathematically.

The system performs twice an orthogonal transformation of real quantities and inserts between these two transformations a time shift of 90° of the signals relative to each other. The first regulating circuit results in the signal voltages $A_1$ and $B_1$ which at first are not yet in phase but are mutually time displaced by exactly 90°. These signals correspond to those which would be issued by a dipole cross oriented in the main polarization direction. Thus, the main axes of the polarization are ascertained; they are displaced by the angle *p* relative to the actual antenna axes. Then the signal voltages $A_1$ and $B_1$ are placed in phase with each other by means of the above-mentioned time displacement of the signals relative to each other, and are then again issued through a regulating device of the same design and performance. The then resulting parameter angle *e*, which can vary only within ±45°, indicates by its sign the polarization rotation direction and is equal to zero when the polarization is strictly linear.

The components or modules of the system shown in FIG. 4 are essentially similar to the respective modules identified by the same reference characters in FIGS. 2 and 3. Accordingly, the broken-line portion 1 of the system includes the circuitry that performs the unitary transformation in accordance with equation (2). In contrast to the systems of FIGS. 2 and 3, the channels A and B in the system of FIG. 4 directly lead to the respective multipliers 5 and 5' which are connected, as already described, with respective adders 6 and 6'. As a result, the leads 23*a* and 23'*a* provide the signal voltages $A_1$ and $B_1$. These leads 23*a* and 23'*a* are connected with each other through the demodulator 7' whose output 24' leads to the regulator 3' which, in turn, controls through lead 25 the multipliers 5 and 5' which now indicate the angle *p*. The angle *p* itself can be indicated by a suitable instrument 27.

As mentioned, exactly the same regulating circuit is again formed through a phase rotating member 8 in channel lead 23*a*, so that at the outputs of the regulating circuits there will appear the respective signals $A_2$ and $B_2$. These signals are joined with each other through the modulator 7. The modulator 7 is connected through lead 24 with the regulator 3'' which acts upon the multipliers 5 and 5' forming the cosine and sine respectively of the parameter *e*. The quantity *e* may also be indicated in an instrument 27'.

FIG. 5 shows the use of a system according to the invention, particularly as embodied in the circuitry of FIG. 4, in telemetry receiving equipment designed similarly to the one shown in FIG. 1 as will be recognized from the fact that the same reference characters are applied to corresponding items respectively.

The signals coming from the horizontally and vertically polarized receiving antennas 10 and 10' enter into the receivers 11 and 11' respectively and are then supplied as communication channels A and B to the predetection combiner 15. In accordance with the above explanations, the predetection combiner effects a utilization of the signals and furnishes the voltages $A_2$ and $B_2$ at the two outputs. By using the quantities $A_2$ and $B_2$, or the quantities $\phi$ and $\alpha$, or the quantities $p$ and $e$, the predetection combiner 15 produces a meaningful combination of the data as well as a corresponding regulation so that, for example, only the channel $A_2$ is applied to the demodulator 16. The demodualtor 16 is connected through lead 17 with an only schematically represented automatic gain control (AGC) 18 which, in the present embodiment, may be common to the two receivers 11 and 11'. At the combiner 15, the two parameters $p$ and $e$ may be supplied to the two instruments 27 and 27' for measuring type of polarization.

In comparison with the known systems initially mentioned in this specification, the above-described combiner systems according to the invention have the advantage that they can be employed in receiving equipment whose automatic gain control (AGC) and automatic phase regulation (APC) is common to all of the channels. Furthermore, the optimal combination from the receiving channels A and B can be formed at any occurring amplitude and phase conditions of the useful signals in both channels without the necessity of measuring these amplitudes and phases. A system according to the invention performs satisfactorily also in the event of comparatively highly fluctuating disturbance signals, such as galactic noise depending upon the position of the antennas. The accuracy of performance in a system according to the invention, being higher than in the known system, also suffices for utilizing such a system also for measuring the type of polarization.

The above-described correlation detectors 7, 7' may consist of commercially available ring modulators or analog multipliers. Such detectors have a direct-voltage output signal when both signals contain correlated in-phase signal components. Applicable as phase shifters 4, 4' are conventional phase-rotation devices such as those obtainable (type PSE 3) from Merrimac Research and Development Inc., 14 Fairfield Place, West Caldwell, N.J. The sine and cosine multipliers may consist of conventional sine, cosine potentiometers with a drive motor controlled by the signal on line 25, such motor-driven potentiometers being known, for example, from the book by Smith and Wood, "Principles of Analog Computation," published by McGraw-Hill, 1959, pages 15 and 16. Also applicable, in lieu of such potentiometers, are also the commercially available electronic multipliers which receive a multiplicand signal from line 21 and a multiplicator signal from the output of a cosine or sine function generator whose input signals come from line 25', such multipliers with sine or cosine function generators being obtainable, for example, from Teledyne Philbrick Nexus, Allied Drive at Route 128, Dedham, Mass. The adders 6 and 6' and the integrators in component 3 are, for example, of the type described in the book by Warfield, "Introduction to Electronic Analog Computers," published by Prentice-Hall, Inc. 1959, pages 5 and 6. Conventional sine and cosine multipliers of the aforementioned general type are furthermore known from U.S. Pat. No. 3,009,638 of S. M. Merz et al., issued Nov. 21, 1961 and entitled Trigonometric Function Generator. Other sine and cosine multipliers are known from U.S. Pat. No. 3,440,441, issued Mar. 11, 1965 of A. J. Ley, entitled Multiplicative Modulators, as well as earlier U.S. Pat. No. 3,197,626 of G. E. Platzer, Jr. entitled Logarithmic Multiplier-Divider, and 2,661,152 of P. Elias entitled Computing Device, for example.

To those skilled in the art it will be obvious upon a study of this disclosure that our invention permits of various modifications and may be given embodiments other than particularly illustrated and described herein without departing from the essential features of the invention and within the scope of the claims annexed hereto.

We claim:

1. A communication channel combiner network having an output channel for a combined signal and having two communication input channels containing respective input signals composed of mutually coherent signals of respectively different amplitudes and phases aside from respective uncorrelated spurious signals of mutually equal intensities, said combiner network interconnecting said two input channels and having first circuit means for forming two linear combinations of said input signals and thus performing a linear transformation of said intput signals, one of said linear combinations forming said combined signal; two regulating circuits controlling said first circuit means and providing two control parameters for said first circuit means, said regulating circuits being connected and said circuit means being constructed so that said linear transformation is maintained as a unitary transformation, said first circuit means comprising phase shifters determining the mutual phase shift of the two input channels, said phase shifters being controllable by one of the control parameters, multipliers connected to the ouput of said phase shifters said multipliers being adapted to multiply each of the output signals of said phase shifters by the sine and simultaneously by the cosine of the other control parameter thus forming four output signals, and adders adapted to form the sum of the sine-multiplied output of the first multiplier and the cosine-multiplied output of the second multiplier, and to form the difference of the cosine-multiplied output of the first multiplier and the sine-multiplied output of the second multiplier, the output of said adders forming said linear combinations, said combiner network further comprising second circuit means connected to said linear combinations to determine mutual correlation between said linear combinations, and said regulating circuits being actuatable so as to eliminate said mutual correlation, said second circuit means comprising two correlation detector networks one of which being preceded by a 90° phase shifter, the outputs of said correlation detector networks being feedback-connected to the inputs of said regulating circuits, and said regulating circuits providing said control parameters.

2. A communication channel combiner network having an output channel for a combined signal and having two communication input channels containing respective input signals composed of mutually coherent signals of respectively different amplitudes and phases aside from respective uncorrelated spurious signals of mutually equal intensities, said combiner network interconnecting said two input channels and having first circuit means for forming two linear combinations of said input signals and thus performing a linear transformation of said input signals, one of said linear combinations forming said combined signal; two regulating circuits controlling said first circuit means and providing two control parameters for said first circuit means, said regulating circuits being connected and said circuit means being constructed so that said linear transformation is maintained as a unitary transformation, said first circuit means comprising two cascade connected transformation circuit means, each of which is adapted to perform a linear transformation of input signals applied thereto, and each of which is dependent upon only one of said two control parameters, one of said two regulating circuits being connected to a first one of said two transformation circuit means for controlling the parameter of the first one of said two transformations to provide a pregiven correlation between the two linear combinations the second one of said regulating circuits being connected to said other transformation circuit means for controlling the parameter of the second transformation so that the correlation of the two linear combinations vanishes upon said second transformation, said first transformation circuit means comprising a phase shifter controllable by said first regulating circuit for phase shifting said two input channels relative to each other so as to reduce to zero the imaginary portion of the correlation product of the two phase shifted channels, said second transformation circuit means comprising multipliers for multiplying each of said phase shifted channels by the sine and simultaneously by the cosine of the other control parameter, thus forming four output signals, said first circuit means further comprising adders for forming the sum of the sine-multiplied output of the first multiplier and the cosine-multiplied output of the second multiplier and for forming the difference of the cosine-multiplied output of the first multiplier and the sine-multiplied output of the second multiplier, the output of said adders forming said linear combinations said other control parameter being controllable by said second regulating circuit to reduce to zero the correlation product of the two resulting linear combinations said combiner network further comprising second circuit means connected to said linear combinations, and said regulating circuits being actuatable so as to eliminate said mutual correlation.

3. A communication channel combiner network having an output channel for a combined signal and having two communication input channels containing respective input signals composed of mutually coherent signals of respectively different amplitudes and phases aside from respective uncorrelated spurious signals of mutually equal intensities, said combiner network interconnecting said two input channels and having first circuit means for forming two linear combinations of said input signals and thus performing a linear transformation of said input signals, one of said linear combinations forming said combined signal; two regulating circuits controlling said first circuit means and providing two control parameters for said first circuit means, said regulating circuits being connected and said circuit means being constructed so that said linear transformation is maintained as a unitary transformation, said first circuit means comprising two cascade-connected transformation circuit means, each of which is adapted to perform a linear transformation of input signals applied thereto, and each of which is dependent upon only one of said two control parameters, one of said two regulating circuits being connected to a first one of said two transformation circuit means for controlling the parameter of the first one of said two transformations to provide a pregiven correlation between the two linear combinations, the second one of said regulating circuits being connected to said other transformation circuit means for controlling the parameter of the second transformation so that the correlation of the two linear combinations vanishes upon said second transformation, and first transformation circuit means comprising multipliers for multiplying each of the input channels by the sine and simultaneously by the cosine of the first control parameter, thus forming four output signals, adders for forming the sum of the sine-multiplied output of the first multiplier and the cosine-multiplied output of the second multiplier and for forming the difference of the cosine-multiplied output of the first multiplier and the sine-multiplied output of the second multiplier, the output of said adders forming the output of the first transformation circuit means, the control parameter of said first transformation circuit means being controllable by said first regulating circuit to reduce to zero the real portion of the correlation product of the two signals resulting from the transformation, said second transformation circuit means comprising 90° phase shift means for 90° phase-displacing said two latter signals relative to each other, multipliers for multiplying each of said phase-displaced signals by the sine and simultaneously by the cosine of the second control parameter, thus forming four output signals, and adders for forming the sum of the sine-multiplied output of the first multiplier and the cosine-multiplied output of the second multiplier and for forming the difference of the cosine-multiplied output of the first multiplier and the sine-multiplied output of the second multiplier, the output of said adders forming the output of the second transformation circuit means, the control parameter of said second transformation circuit means being controllable by said second regulating circuit to reduce to zero the correlation product of the signals resulting from the latter transformation, said combiner network further comprising second circuit means connected to said linear combinations to determine mutual correlation between said linear combinations and said regulating circuits being actuatable so as to eliminate said mutual correlation.

* * * * *

UNITED STATES PATENT OFFICE
CERTIFICATE OF CORRECTION

PATENT NO. : 3,835,392

DATED : September 10, 1974

INVENTOR(S) : Helmut Mahner and Karl Kammerlander

It is certified that error appears in the above-identified patent and that said Letters Patent are hereby corrected as shown below:

In the heading to the printed specification the priority information was omitted. It should read as follows:

--Foreign Application Priority Data December 4, 1969

Germany P 19 60 994.0--.

Signed and sealed this 10th day of June 1975.

(SEAL)
Attest:

RUTH C. MASON
Attesting Officer

C. MARSHALL DANN
Commissioner of Patents
and Trademarks